United States Patent [19]

Korff

[11] 4,407,540
[45] Oct. 4, 1983

[54] WINDOW CONSTRUCTION FOR PASSENGER VEHICLES

[76] Inventor: Walter H. Korff, 449 N. Lamer St., Burbank, Calif. 91506

[21] Appl. No.: 291,087

[22] Filed: Aug. 7, 1981

[51] Int. Cl.³ .............................................. B60J 1/00
[52] U.S. Cl. ..................................... 296/146; 49/227; 296/84 R
[58] Field of Search ..................... 296/146, 84 R, 1 S; 49/227, 348, 353, 385

[56] References Cited

U.S. PATENT DOCUMENTS

| | | | |
|---|---|---|---|
| 3,027,186 | 3/1962 | Charipar | 296/84 R |
| 3,158,395 | 11/1964 | Smith | 296/146 |
| 3,541,732 | 11/1970 | Hanson | 49/227 |
| 3,745,703 | 7/1973 | Francis | 49/227 |

Primary Examiner—Bruce H. Stoner, Jr.
Assistant Examiner—John A. Carroll
Attorney, Agent, or Firm—Shlesinger, Arkwright, Garvey & Fado

[57] ABSTRACT

A vehicle has a smooth unobstructed aerodynamically contoured window surface with a side window segment retractable within the passenger door.

17 Claims, 9 Drawing Figures

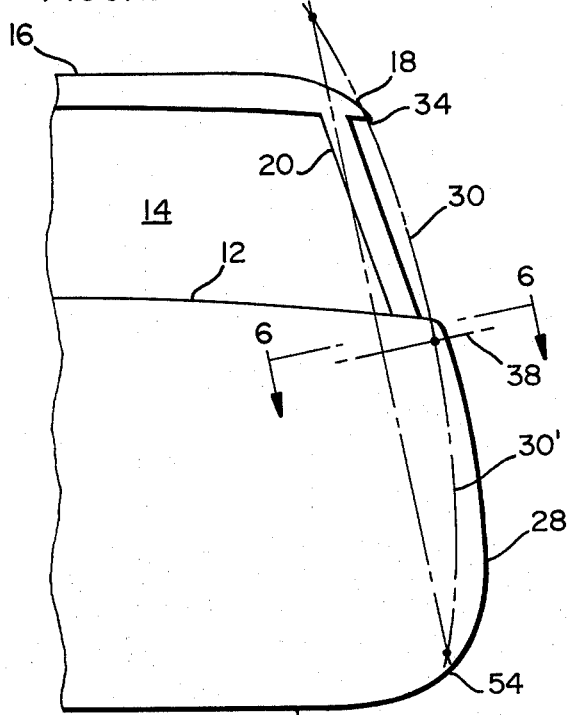
FIGURE 5
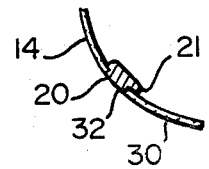
FIGURE 8
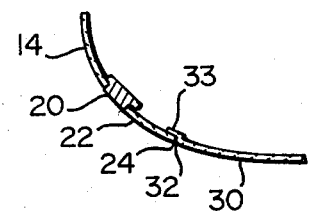
FIGURE 9
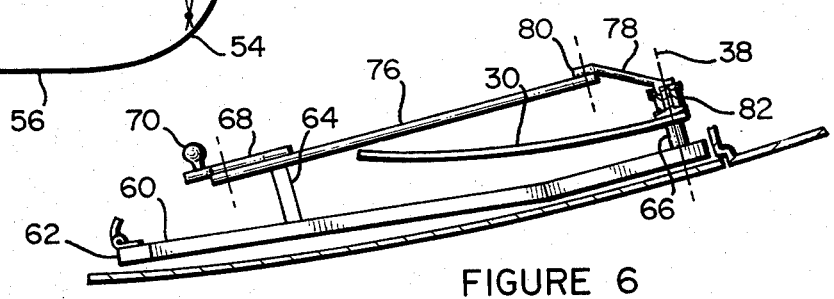
FIGURE 6
FIGURE 7

WINDOW CONSTRUCTION FOR PASSENGER VEHICLES

BACKGROUND OF THE INVENTION

This invention relates to an improved aerodynamically contoured window surface construction for passenger vehicles.

Within the last several years there has been an increasing interest in automotive aerodynamic efficiency. This interest has been heightened by the rapidly rising fuel prices and the difficulty of providing further engine efficiency increases.

The improvement of aerodynamic flow across the vehicle surface has been studied extensively in experimental type cars, with a view to reducing the coefficient of drag to about 0.2.

One of the principal drawbacks of such designs is in the area of the windows which imposes a requirement of a continuous shaped area not practical in a production model vehicle. This difficulty is mainly due to the fact that in the windshield and side window area it is necessary to have a window which readily opens for convenience of the vehicle occupants. The need to contour the window surface for air flow improvement heretofore precluded use of a retractable window. This limitation of aerodynamic design has been longstanding and heretofore has not been successfully solved.

SUMMARY AND FEATURES OF INVENTION

Accordingly, it is a principal feature of this invention to overcome the above-noted drawbacks and to provide an aerodynamically contoured exterior surface in the window area.

Another feature of this invention is to substantially lower the coefficient of drag and transverse wind resistance in the upper window area of a passenger vehicle.

A still further feature of this invention is to provide a fully contoured side surface which will minimize the effect of cross winds.

Another feature of this invention is to provide a means of supporting a contoured type movable window having both horizontal and vertical curvatures, such that it can be retracted within the door of the vehicle.

A still further feature of this invention is to provide a window for a contoured type vehicle which can readily be opened or closed.

A still further feature of this invention is to provide the ability to allow a contour surface to be used in a production type passenger vehicle which will have a readily retractable and openable side window.

Another feature of this invention is to provide a readily operable means for opening and closing such window.

A still further feature of this invention is to provide a means of supporting a retractable double-contoured window surface on a door panel.

These and further features of this invention will become apparent from the following description of the drawings.

DESCRIPTION OF THE DRAWINGS

FIG. 5 is a forward view of the vehicle illustrating the general arc and movement of the movable window segment.

FIG. 6 is a sectional view through the door along line 6—6 of FIG. 5.

FIG. 7 is a partial cut-away view of the door panel of the vehicle of FIG. 2 illustrating the control linkage for the movable window segment.

FIG. 8 is a sectional view along the line 8—8 of FIG. 7 illustrating the curvature of the surface formed by the several surface elements at that point.

FIG. 9 is a sectional view along the line 9—9 of FIG. 7 illustrating the curvature of the surface formed by the several surface elements of the contoured window assembly at that position.

DESCRIPTION OF THE INVENTION

Figure 1:
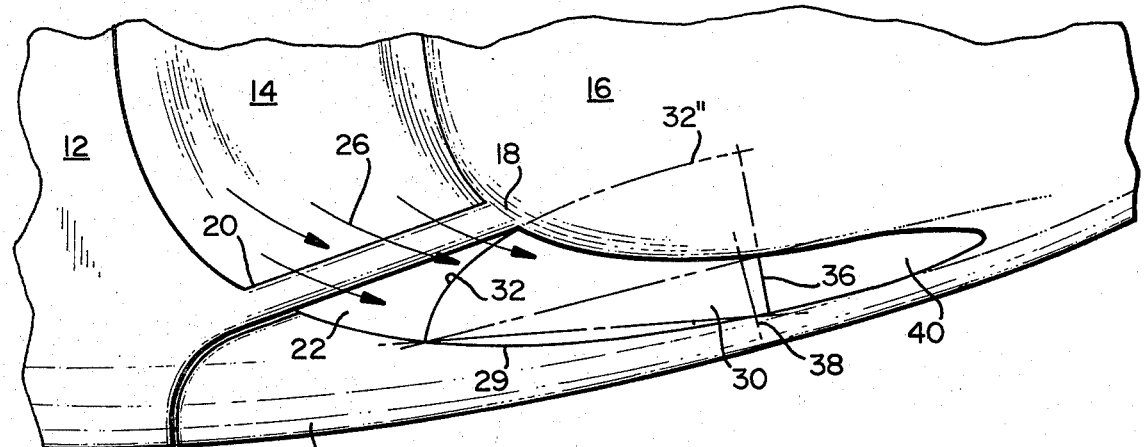
FIG. 1 is a partial top view of a vehicle having a contoured windshield and side window surface.
Figure 2:
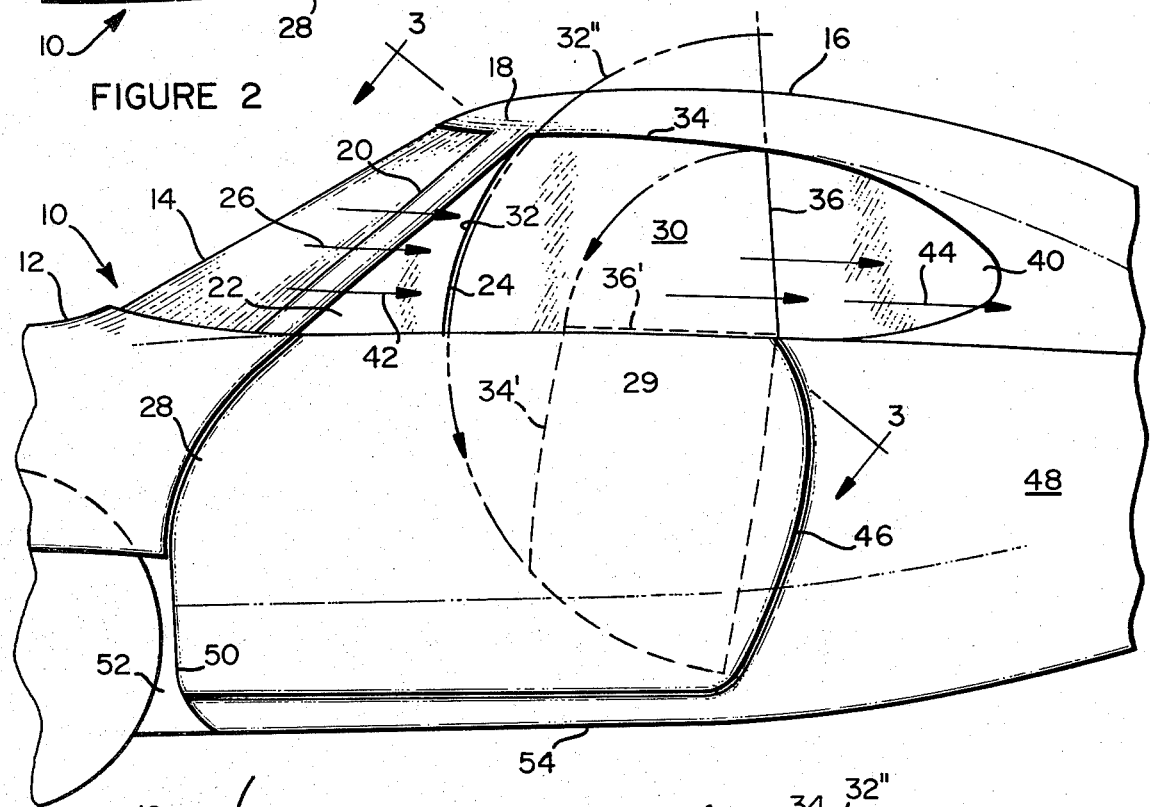
FIG. 2 is a partial side view of the vehicle of FIG. 1 showing the contoured windshield and side window surface.

Referring particularly to the drawings, FIGS. 1 and 2 generally show a motor vehicle 10 with a hood 12 and windshield 14 which is rounded adjacent its side edges and inclined rearwardly toward the roof 16. The roof has a concave section 18 adjacent its lower edges extending rearwardly from the "A" post 20. A glass panel 22 of triangular configuration is fixed in position immediately behind the "A" post and has a rear peripheral edge 24 of arcuate shape. The general bend of the air flow around the windshield section adjacent the "A" post and the "A" post area is shown at 26.

Along the side of the vehicle, the triangular piece glass panel 22 is supported on the side door above door panel 28 and immediately in front of a concave-shaped surface movable window segment 30. The segment has a rounded forward peripheral edge 32 which has the same arcuate shape as the edge 24 and is in line contact abutment therewith.

The movable window segment has a top edge 34 which extends along and engages the lower portion of the roof immediately below the rounded concave roof section 18. The rear edge 36 of the movable segment 30 is disposed immediately in front of rear side window 40 in abutting relation with its forward edge. The whole window is above the upper edge 29 of the closed door panel 28.

Figure 3:
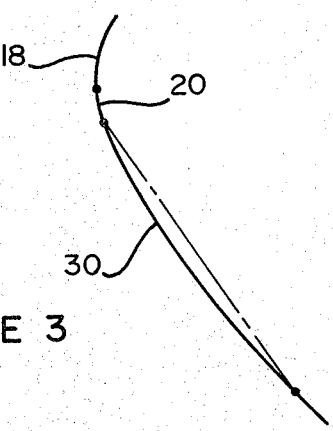
FIG. 3 is a sectional view along the line 3—3 showing the outward surface curvature of the vehicle in the window area.

The rounded unitary contoured configuration of the elements of the forward upper periphery of the motor vehicle along line 3—3 is shown in FIG. 3 and includes the curved edge section 18 of the forward portion of the roof, the outer surface of the "A" post 20 and the outwardly bowed concave surface of the movable window segment 30.

FIG. 5 also illustrates the curved configuration and contour of the movable window segment 30 in the vertical plane.

Figure 4:
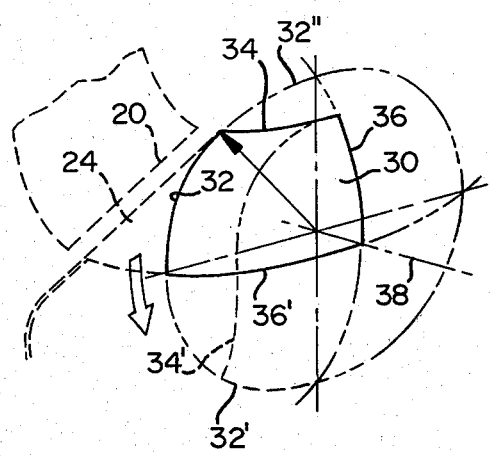
FIG. 4 is a perspective schematic drawing indicating the relative position and movement of the movable window segment.

Referring to FIG. 4, it will be seen that the movable window segment 30 is pivoted along the axis 38 and that its periphery 32 has an arcuate radius centered on the axis 38. The movable segment 30, as indicated in FIG. 4 pivots in a downward direction, and into the door panel about axis 38.

It will be seen that the segment pivots downwardly to the positions indicated by the dotted lines for 32', 34', 36' which represent the surfaces of 32, 34, and 36. The general vertical arc of the line 32 is extended in section to the line 32" to illustrate the arc about the pivot point 38, and the space requirement of the segment in the panel. The rear window panel 40 is disposed immediately behind the surface 36 of the movable panel which it abuts.

The direction and flow of air along the contoured surface toward the rear of the car is shown by the arrows 44. The rear edge 46 of the passenger door panel 28 abuts the forward edge of the rear fender panel 48. The passenger door fits at its forward surface 50 immediately behind the front wheel fender 52.

Note in FIG. 5 that the lower section of the vehicle has a rounded section 54 between the side door panel 28 and the underpanel 56, to reduce cross wind resistance, and that there is significant room to accommodate the tip of the window.

In FIGS. 6 and 7 the manner of operating the movable window segment 30 from its closed to open retractable position is shown. The door side reinforcing frame has an upper horizontal member 60 supporting by a connecting vertical member 62 to which the hinge of the door is attached. A vertical support member 64 or linkage is disposed at the midsection of the frame and a rear upright linkage supporting piece 66 is supported at the rear of the panel brace member 60. A crank link 68 having a rounded handle 70 is pivoted to the top of the vertical support piece 72. The pivot 74 connects the forward end of the horizontal connecting link 76. The other end of the connecting link 76 is connected at the pivot 80 to the rear crank link 78, which in turn is pivoted at 82 to the top of the rear upright linkage and pivot support piece 66. Spring bias is provided by the spring 84 which is connected to the upright vertical support 64 at the tab 65 and to the rear end of the horizontal activating link 76 at 77.

The arc of swing of the linkage is shown in FIG. 7 for the forward crank at 90 and for the rear following crank at 92. The window is shown in the upper locked position in FIGS. 6 and 7.

FIGS. 8 and 9 show the contour surface at the "A" post at the positions 8—8 and 9—9 of FIG. 7. It will be noted that the exterior surface provides a smooth uninterrupted surface area free of beads or gutters in which the windshield is curved adjacent the side edge and is mounted on the "A" post 20, the exterior surface of which has a blending curve so that there is a smooth transition. Similarly, the side window 30 and also the side window segment 22 have a bowed outward curve and meet the exterior surface of the "A" post in a continuous, noninterrupted surface.

In this respect, it should be noted the curves blend without a sharp abrupt change of direction. Preferably, each of these members approach the area of the "A" post at a very small angle to a tangent to the surface at the "A" post edges. Preferably, the windshield edge section is at approximately 45° to the vehicle centerline and the remaining 45° of bend is made by the "A" post and side window.

The movable side window segment has a lateral support provided by the use of a flange. In FIG. 8, the "A" post is shown with an extending flange piece 21 which extends behind the forward periphery 32 of the movable side window segment. This supports the window laterally and prevents it from being moved inwardly.

In FIG. 9, the rib 33 is disposed immediately adjacent the forward periphery 32 of the movable window 30 and occupies a substantial portion of the surface in an arcuately extending line to provide an elongated arcuate flange. As indicated in FIG. 7, it is disposed immediately behind the fixed side window glass panel piece 22 and along its periphery 24. This gives lateral support to the window and keeps the window segment 30 from moving outwardly. With the coaction of both these two flanges, the movable segment is held in direct lateral alignment with its adjacent abutting surface.

It will be seen that the linkage is operated by grasping the handles 70 and rotating it from the locked forward position where it rests on top of the link support piece 64 above the pivot, to the rearward position. As the knob 70 traverses the arc 90, the rear crank link 78 is moved by the elongated connecting link 76 along the arc 92. The convex-shaped window segment 30 is directly connected on the pivot assembly 62 and rotates downwardly through a 90° arc as indicated in FIGS. 2 and 4.

The concave segment will rotate into the door along the lines indicated by 30' in FIG. 5.

It will be noted that in the locked position, the forward link crank cannot be moved any further in its arc of travel 90 in a downward direction because the top of the link acts as a stop. This double-crank mechanism is particularly effective for a manual operation. However, it should be noted that the window can be operated electrically about its pivot 82 also.

With respect to the fixed panel at 22 and the movable panel 30, it should be noted that the specific window design may vary according to the type of vehicle and its general contour at the "A" post area. For example, the fixed pane 22 as shown in FIG. 2 meets the "A" post and roof at its upper tip. However, it may be desirable to extend the arc of movable window area to 90°, in which event the movable window section would have an arcuate forward edge 32 which extended through 90° to meet the roofline 34 at approximately the rear edge 36 of the movable window. In this instance, the fixed glass section 22 would extend further up and along the roofline adjacent the movable window section 30. Similarly, it might be adequate for some purposes to have a smaller movable segment 30 such that it was a small quadrant section which did not meet the roof at all. In this instance the fixed window section 22 would extend completely around the arcuate surface of the movable window 32 and engage at its rear section the top area of the rear window 40 along an extension of the rear edge 36 of the movable window segment.

It should be noted that with respect to the fixed window area that it also may have a contour which would be curved to match the overall contour of the "A" post area and of the roof area.

It should also be noted with respect to the window raising linkage of FIGS. 6 and 7, that to conserve space and permit a flatter door thickness, the link 78 can be disposed perpendicular to the pivot line 38, and the horizontal activating link 76 bent inwardly at about its midpoint toward the window section 30. It is also possible to provide a more compact linkage mechanism by extending the post 64 slightly and inclining it rearwardly to permit the horizontal activating link 76 to extend closer to the movable window section 30. In this instance, link 78 would be extended perpendicular to the axis 38 and would be connected to the articulating link 76 by a ball joint at the pivot point 80.

With respect to the contour of the vehicle in the area of the "A" post and roofline, the contour would vary depending upon the type of vehicle. For example, a wide vehicle such as a station wagon or van would remain the same width with a substantially curved windshield--"A" post and side window section and provide an aft body taper rearwardly of the "A" post area. In this instance also, the double contoured surface of the movable window section will play an important part in the flexibility to contour the vehicle side area.

With the capability of using a bowed or concave shaped outer surface along the window periphery, the capability of designing and using a fully rounded and aerodynamically contoured surface, or possibly a cone-shaped movable segment having straight line elements radiating out from its pivot (in cone shape) to the fixed pane 22, is made possible.

In the past, the designer was limited to a substantially flat side window which meant that a sharp curve on the other surfaces had to be made with reduced capability for maintaining air flow along the exterior vehicle surfaces in the side window areas.

With the use of the movable segment for a side window, it is possible to provide for large radius curves on adjacent windshield and roof surfaces, providing for a contour in both the horizontal and vertical directions.

In addition, with these contours and the elimination of rain gutters at the roof edge and irregular surfaces at the "A" post, a smooth uninterrupted and continuously curved aerodynamic surface encompassing both the side window, windshield and roof area becomes a practical reality for a production model passenger vehicle.

With this type of surface configuration the movement of air around the vehicle body can pass laterally above and below the vehicle and a more symmetrical pattern is obtained, thereby reducing drag. This results because of a smooth curved surface which has no irregularities to trip the air flow. In addition, because of the gentler curve in the surfaces, separation of the boundary layer as it moves along the vehicle surface is reduced, thereby resulting in decreased drag.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A window construction for passenger vehicles having improved aerodynamic characteristics in combination with a closed passenger body having a front windshield, a roof, and a pair of side passenger doors, comprising:
   a. said front windshield having a pair of side edges with a curved section adjacent each of said side edges;
   b. a pair of side window assemblies, each of said side window assemblies being disposed in an associated one of said side passenger doors;
   c. said side window assemblies each having a front segment and a rear segment, said front segment having a forward edge, and at least one of said segments being movable;
   d. said side window assemblies each having a generally convex surface;
   e. a pair of "A" posts, each of said "A" posts being disposed between one of said side edges and said forward edge of an associated one of said side window assemblies and each of said "A" posts having a pair of associated edges;
   f. said front windshield assembly, said "A" posts, and said side window assemblies each having an external surface;
   g. each side edge abutting one edge of said pair of associated edges of each of said "A" posts whereby said front windshield external surface is aligned with each external surface of said pair of "A" posts; and,
   h. said forward edge of each side window assembly abutting said other one edge of said pair of associated edges whereby each "A" post external surface is aligned with said associated side window assembly external surface for providing an integral unitary aerodynamic surface.

2. The window construction for the passenger vehicle of claim 1, wherein:
   (a) each movable window segment has means connected thereto to retract it into and associated passenger door.

3. The window construction for the passenger vehicle of claim 1, wherein:
   (a) a pivot is disposed in said associated passenger door on which said moveable window segment is pivotably supported at a rear lower corner thereof, and
   (b) each moveable window segment having an opposite forward periphery with an arcuate periphery radially centered at said pivot.

4. A window construction for the passenger vehicle of claim 1 wherein:
   (a) each moveable window segment having guide means for holding said moveable window segment in alignment with said associated side window assembly.

5. The window construction for the passenger vehicle of claim 4, wherein:
   (a) said guide means includes an interior noninterferring flange cooperating with said moveable window segment and an abutting fixed member.

6. The window construction for the passenger vehicle of claims 1 or 3, wherein:
   (a) each side window assembly includes a small generally triangular piece in fixed engagement with an associated "A" post and being immediately forward of said movable window segment.

7. The window construction for the passenger vehicle of claim 1, wherein:
   (a) said exterior surfaces of adjacent abutting elements very closely approaches a tangential line along their line of abutment.

8. The window construction for the passenger vehicle of claim 1, wherein:
   (a) said roof having a contour above each of said side assemblies and said contour being a convex shaped section immediately above a lower side edge of said roof, and
   (b) said side window assemblies each having an upper portion with an inwardly sloping exterior surface which terminates along an upper edge and forms a line of abutment with an exterior surface of said lower side edge of said roof.

9. The window construction for the passenger vehicle of claim 2, wherein:
   a. each moveable window segment being angularly pivotable.

10. A window construction for passenger vehicles having improved aerodynamic characteristics in combination with a closed passenger body having a front windshield, a roof, and a pair of side passenger doors, comprising:
   a. said front windshield having a pair of side edges with a curved section adjacent each of said side edges;
   b. a pair of side window assemblies, each of said side window assemblies being disposed in an associated one of said passenger doors;
   c. said side window assemblies each having a front segment and a rear segment, said front segment having a forward edge, and at least one of said segments being moveable;
   d. said side window assemblies each having a generally convex surface;
   e. a pair of "A" posts being disposed between one of said side edges and said forward edge of an associated one of said side window assemblies and each of said "A" posts having a pair of associated edges;
   f. said front windshield assembly, said "A" posts, and said side window assemblies each having an external surface;
   g. each side edge abutting one edge of said pair of associated edges of each of said "A" posts whereby said front windshield external surface is aligned with each external surface of said pair of "A" posts;
   h. said forward edge of each side window assembly abutting said other one edge of said pair of associated edges whereby each "A" posts external surface is aligned with said associated side window assembly external surface for providing an integral unitary aerodynamic surface; and,
   i. means connected to each of said moveable window segments for retracting each moveable window segment into an associated side passenger door.

11. The window construction for the passenger verhicle of claim 10, wherein:
   (a) a pivot being disposed in each passenger door and on which said movable window segment is pivotally supported at a lower corner thereof.

12. The window construction for the passenger vehicle of claim 11, wherein:
   (a) said means connected to said movable window segment includes a manually operable nonparallel crank linkage connected to said pivot.

13. The window construction for the passenger vehicle of claim 11, wherein:
   (a) said pivot having a pivot axis perpendicular to an outer surface of said associated passenger door.

14. The window construction for the passenger vehicle of claim 11, wherein:
   (a) a control linkage is connected to said pivot for the moveable window segment, and
   (b) said control linkage providing a lock arrangement for said moveable window segment when said moveable window segment reaches an upright position.

15. The window construction for the passenger vehicle of claim 12 or 14, wherein:
   (a) spring means being connected to said control linkage and to said passenger door for providing a spring bias tending to hold said movable window segment in an upright closed position.

16. The window construction for the passenger vehicle of claim 1 or 10, wherein:
   (a) said windshield having an arcuate curve from a centerline of said passenger vehicle to each of said side edges and being approximately 45°.

17. The window construction for the passenger vehicle of claims 11 or 15, wherein:
   (a) said moveable window segment of each of said side window assemblies having a forward and upper periphery and tapering inwardly toward said forward and upper periphery.

* * * * *